United States Patent
Heck

(10) Patent No.: US 8,775,416 B2
(45) Date of Patent: Jul. 8, 2014

(54) ADAPTING A CONTEXT-INDEPENDENT RELEVANCE FUNCTION FOR IDENTIFYING RELEVANT SEARCH RESULTS

(75) Inventor: Larry P. Heck, Los Altos, CA (US)

(73) Assignee: Yahoo!Inc., Sunnyvale, CA (US)

( * ) Notice: Subject to any disclaimer, the term of this patent is extended or adjusted under 35 U.S.C. 154(b) by 307 days.

(21) Appl. No.: 11/971,745

(22) Filed: Jan. 9, 2008

(65) Prior Publication Data

US 2009/0177645 A1    Jul. 9, 2009

(51) Int. Cl.
*G06F 17/30* (2006.01)
*G06F 7/00* (2006.01)

(52) U.S. Cl.
CPC .............................. *G06F 17/30867* (2013.01)
USPC .......................................... 707/723; 707/731

(58) Field of Classification Search
CPC ..................... G06F 17/30864; G06F 17/30867
See application file for complete search history.

(56) References Cited

U.S. PATENT DOCUMENTS

| | | | |
|---|---|---|---|
| 5,864,810 A | 1/1999 | Digalakis et al. | |
| 6,343,267 B1 | 1/2002 | Kuhn et al. | |
| 7,124,149 B2 * | 10/2006 | Smith et al. | 707/104.1 |
| 7,197,497 B2 | 3/2007 | Cossock | |
| 7,761,447 B2 * | 7/2010 | Brill et al. | 707/728 |
| 8,458,165 B2 * | 6/2013 | Liao et al. | 707/713 |
| 2007/0106659 A1 * | 5/2007 | Lu et al. | 707/5 |
| 2007/0233671 A1 * | 10/2007 | Oztekin et al. | 707/5 |
| 2007/0239680 A1 * | 10/2007 | Oztekin et al. | 707/3 |
| 2008/0005068 A1 * | 1/2008 | Dumais et al. | 707/3 |
| 2008/0082518 A1 * | 4/2008 | Loftesness | 707/5 |
| 2012/0271842 A1 * | 10/2012 | Sun et al. | 707/765 |

OTHER PUBLICATIONS

Kirby, K. et al., "Application of the Karhunen-Loeve Procedure for the Characterization of Human Faces", IEEE Pattern Analysis and Machine Intelligence, V. 12, No. 1, pp. 103-108 (1990).

* cited by examiner

*Primary Examiner* — Alicia Lewis
(74) *Attorney, Agent, or Firm* — Hickman Palermo Truong Becker Bingham Wong LLP

(57) ABSTRACT

Techniques for predicting user interests based on information known about a specific context is provided. A context-independent relevance function is generated from information gathered from many users and/or from many documents (or files). Information about a specific context (e.g., a particular user, a particular group of users, or type of content) is used to adapt the CI relevance function to the specific context. Based on a query submitted by a user, the adapted relevance function is used to identify results that the user would most likely be interested in. Results may include references to webpages and advertisements.

26 Claims, 3 Drawing Sheets

ADAPTING A CONTEXT-INDEPENDENT RELEVANCE FUNCTION FOR IDENTIFYING RELEVANT SEARCH RESULTS

RELATED CASES

This application is related to U.S. Pat. No. 7,197,497, entitled METHOD AND APPARATUS FOR MACHINE LEARNING A DOCUMENT RELEVANCE FUNCTION, filed on Apr. 25, 2003, the contents of which are herein incorporated by reference in their entirety for all purposes.

FIELD OF THE INVENTION

The present invention relates generally to identifying search results for a specific context. More specifically, the invention relates to adapting a context-independent relevance function to a relevance function for a specific context, e.g., a specific user, group of users, or type of content, and using that adapted relevance function to improve the quality of the search results.

BACKGROUND

Currently available search technologies attempt to identify and return references to resources that are relevant to a particular search query. For example, a user may enter the web search query "baseball scores" to find documents (e.g., webpages and/or websites) that provide information on current baseball scores. The search engine may examine a database of "crawled" webpages to identify webpages that contain the terms "baseball" and "scores". References to a subset of all webpages that contain the terms "baseball" and "scores" are returned to the user to be displayed in a search engine results page (SERP). Additionally, references to webpages that have been labeled by the search engine (or web crawler associated with the search engine) with the terms "baseball" and "scores" may be returned to the user.

Other references that may be returned to a user in a SERP are advertisements. Such advertisements may be related to the query terms. For example, the company of a website that offers baseball equipment may pay for advertisement space on a SERP whenever a search query includes the term "baseball". Thus, given the above search query, the SERP would include a reference to that website. The advertisement arrangement may be that the user must click on the reference to that website in order for the associated company to pay any money.

Goals of search engines include increasing the quality of search results to maximize value to both the user and the advertisers. If ads that are displayed in a SERP are tailored to the interests of a user, then the user is more likely to click on the ads, thus generating ad revenue for the search engine.

There are many situations in which knowledge about a user may assist in increasing the quality of search results and ads. One situation occurs when a query is inherently ambiguous. For example, a user enters the query "jaguar price". Based on that query alone, it is not clear whether the user wants price information about the Jaguar operating system or a Jaguar car. If the search engine knew about, for example, the recent Web activity of the user, then that activity may be used to search for appropriate results. If the user recently was answering questions about the best foreign-manufactured cars via the social networking website Yahoo! Answers™, then it is more likely that the user is interested in discovering the price of a Jaguar car.

However, a user's perception of true relevance is influenced by a number of factors, many of which are highly subjective. Such preferences are generally difficult to capture in an algorithmic set of rules defining a relevance function. Furthermore, these subjective factors may change over time, as for example when current events are associated with a particular query term. As another example, changes over time in the aggregate content of the documents available in the Internet may also alter a user's perception of the relative relevance of a given document to a particular query. A user who receives a SERP, from a search engine, that refers to documents that the user does not perceive to be highly relevant will quickly become frustrated and abandon the use of the search engine.

A recent innovation for increasing the quality of search results is to use machine-learning methods to generate a document relevance function. A document relevance function takes a document and a query as input and returns a relevance value. The relevance value for each document in a set of documents is used to rank the documents. The relevance value may dictate where in a SERP a reference to a document is to be displayed.

Thus, a context-independent document relevance function is used to predict, based on a particular query, what webpages and/or ads may be helpful to a generic user. The generic user represents the interests of all users for which applicable data may be collected. For example, a search engine may maintain a database of all queries that have ever been submitted along with identification data identifying all click-throughs (i.e., references in a SERP that have been selected). A relevance function may be generated using various techniques, one of which is described in U.S. Pat. No. 7,197,497, entitled METHOD AND APPARATUS FOR MACHINE LEARNING A DOCUMENT RELEVANCE FUNCTION.

However, a context-independent relevance function may not yield the most accurate search results for certain user. Given (a) a user with specific usage patterns and preferences, (b) a group of users with relatively specific usage patterns and preferences, or (c) a query that targets files/documents that include a particular type of content, a generic relevance function is not capable of leveraging such information to improve the quality of the search results returned to a user.

An approach for increasing the quality of search results for a particular user is to generate a user-dependent (UD) relevance function, which is a type of a context-dependent relevance function. Such a relevance function is used to predict, based on a particular query, webpages and/or ads that may be relevant to the particular user. Knowledge of a specific user is gathered to generate the UD relevance function. The UD relevance function may be used to provide high-quality query results to the specific user and to target particular advertisements to the specific user. Thus, with the help of UD relevance function, the click-through rate of sponsored advertisements may significantly increase. However, a considerable amount of information needs to be known about a user in order for the corresponding UD relevance function to be accurate and, therefore, useful. Also, a considerable amount of information is known about only a relatively few users. As a result, UD relevance functions are not widely used. Thus, a majority of users are only able to take advantage of generic relevance functions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. For example, although described in the context of web search queries, the types of files or documents that may be searched include database objects in a database system, files in a file system, an address book, etc. In other instances, well-known structures and devices are shown in block diagram form in order to avoid unnecessarily obscuring the present invention.

General Overview

Techniques are provided for accurately selecting results of a query depending on a specific context. Instead of using a generic (or context-independent (CI)) relevance function or a user-dependent (UD) relevance function to identify relevant search results, a relevance function is adapted (i.e., modified) based on information about a specific context. Such an adapted relevance function is referred to herein as a context-specific (CS) relevance function. Non-limiting examples of contexts include a group of users sharing one or more common characteristics, a category of a search query, and a category of a set of documents.

Context-specific information related to users may include Web-related activity (such as search history) and/or non-Web-related activity (such as demographic information). For example, if the context is geographic location where the geographic location is Germany, then a CI relevance function is adapted based on Web-related activity of users in Germany and, optionally, any other information known generally about users in Germany. As a result, a CS relevance function is produced specifically for users in Germany.

The results generated from submitting a query against a CS relevance function may be the same type of results generated from submitting a query against a CI relevance function, such as references (or links) to webpages, which are displayed in a typical SERP. The results may also be advertisements that the CS relevance function predicts the specific user might be interested in. According to the example above, the prediction is based on the characteristics known about users in Germany and, optionally, on the query.

Various techniques may be used to adapt a CI relevance function to produce a CS relevance function. A non-limiting example of one such technique is maximum a posteriori (MAP), which is described below.

Adapting a Relevance Function for a Specific Context

Figure 1:
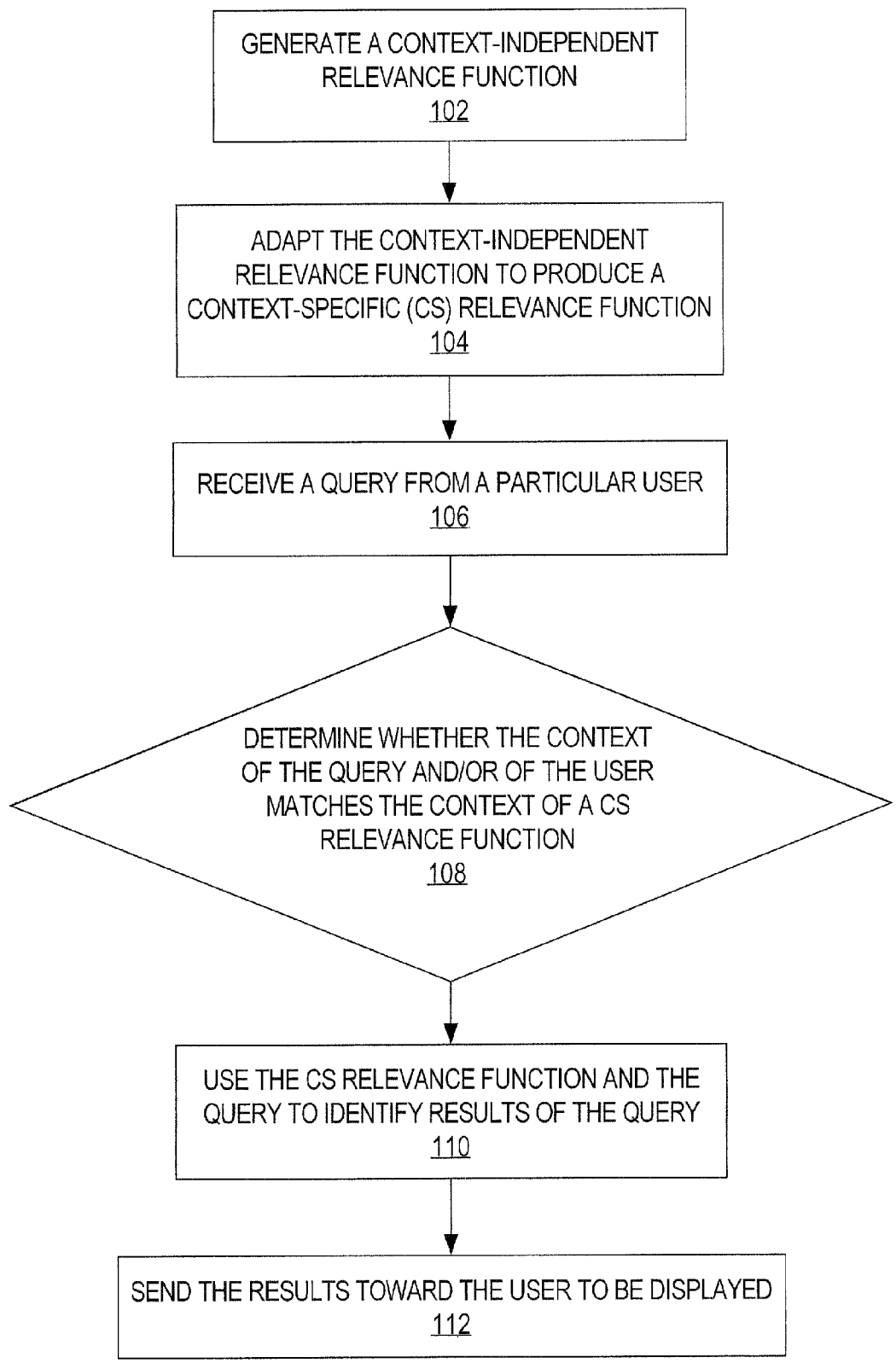
FIG. 1 is a flow diagram that depicts a process for processing a user query, according to an embodiment of the invention.

FIG. 1 is a flow diagram that depicts a process for processing a query, according to an embodiment of the invention. At step 102, a context-independent (CI) relevance function is generated. The CI relevance function may be used to predict which documents a user might be interested in based on a query submitted by the user. At step 104, the CI relevance function is adapted, according to a specific context, to produce a CS relevance function.

EXAMPLE CONTEXTS

Non-limiting examples of specific contexts include content type of a document (or file) or a group of documents and a category of a query. Non-limiting examples of a content type include a category of information provided by a document (or file) and an author or owner of a document. The World Wide Web (WWW) comprises billions of webpages. The WWW may be considered a mosaic of different sets of content types. A set of documents that comprise a similar type of content may be referred to as being of the same content type. Some content types are informational, others are transactional, others are navigational, and others are a combination of the above. Non-limiting examples of content types include images, video, audio, "local" information, shopping, jobs, news, automobiles, finance, games, groups, maps, music, personals, real estate, sports, technology, travel, television, and yellow pages.

Some content types are listed as selectable GUI objects on www.yahoo.com. In response to selecting a GUI object corresponding to a particular content type and submitting a query, a search is directed toward analyzing only documents that are considered to be of that particular content type. For example, if "Shopping" is selected as a content type and a query is submitted, then only webpages that are considered relevant to shopping are analyzed.

Each content type includes characteristics (or features) that are (at least relatively) unique to that content type. For example, a web document that is considered to be of type "local" typically contains a business name, location information, and contact information. As another example, a web document that is considered to be of type "jobs" typically contains job title and job description information. As yet another example, a web document that is considered to be of type "video" typically contains links to a threshold number of video files.

A relevance function is adapted, based on characteristics of documents of a particular content type, to produce a CS relevance function. Thereafter, a query that is submitted in the context of that particular content type is processed against the CS relevance function to generate results relevant to the query.

Another example of a specific context is user type. One or more characteristics may define a user type. Typically, a user type corresponds to a plurality of users. A particular user may belong to more than one user type. Non-limiting examples of user characteristics include visited websites, previously submitted queries, geographic location, demographic information (e.g., gender, ethnicity, income, interests), tagging history, search history, social network activity (e.g., MyWeb 2.0, www.delicious.com, Yahoo! Answers™), and user profiles (e.g., from participation in other services provided by the entity that owns the search engine). Thus, user characteristics are not required to be limited to Web-related activity.

Web-related activity may be gathered in various ways. For example, a user may register with the entity that owns the search engine. After registering, the entity may track the websites the user has visited, the queries the user has submitted, the webpages the user has tagged, and the social networking groups in which the user has participated.

Multiple CS relevance functions may be produced from one or more relevance functions. For example, a CS relevance function may be produced for queries that target video files and/or for webpages that include links to a threshold number of video files. Another relevance function may be produced for users from the San Francisco Bay Area. Yet another relevance function may be produced for users who have tagged movie review sites.

Adapting a Relevance Function (Cont.)

At step 106, a query is received from a particular user. At step 108, it is determined whether the context of the query and/or the user matches the context of a CS relevance function. If the contexts match, then, at step 110, the CS relevance function and the query are used to identify potentially relevant results of the query. At step 112, the results are sent to the particular user to be displayed.

Figure 2:
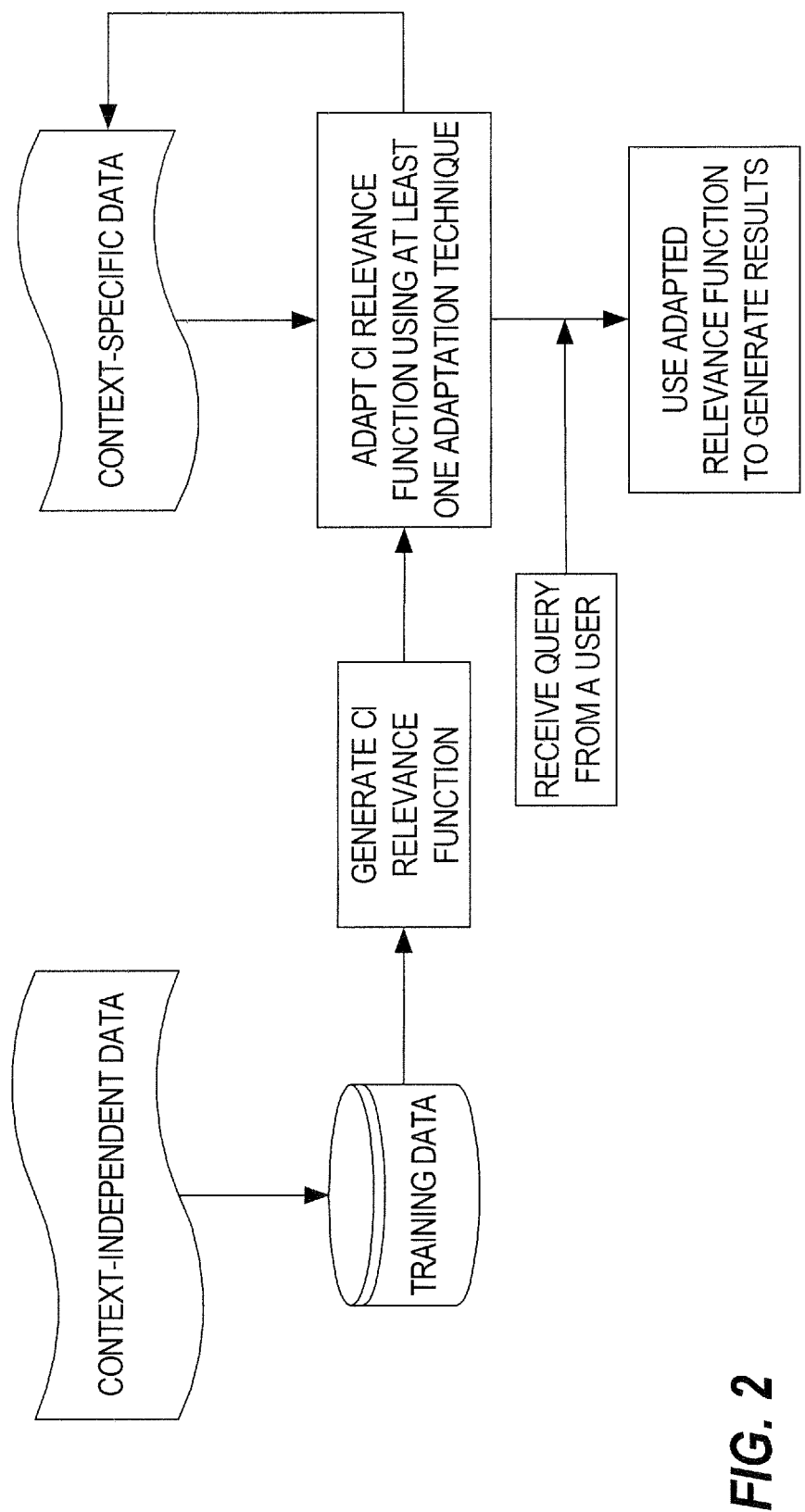
FIG. 2 is a block diagram that depicts the above process in a different manner, according to an embodiment of the invention.

Embodiments of the invention are not limited to the order described above. FIG. 2 depicts the above process in a different manner. FIG. 2 further depicts that as more data about a context is gathered, that additional data is used to further adapt the corresponding CS relevance function, causing that CS relevance function to become increasingly accurate in predicting user intent.

Adaptation Techniques

Adaptation techniques may be used in various different modes. If the adaptation data for a user is labeled (e.g., query with known page views and user responses), then an adaptation technique using such labeled data is termed "supervised adaptation." If the adaptation data is unlabelled, then an adaptation technique using such unlabelled data is termed "unsupervised adaptation."

In the case where all the adaptation data is available in one block, e.g., from offline analysis of logs that capture user search queries and user responses (e.g., page views/clicks), then such adaptation is termed "static adaptation." Alternatively, adaptation might proceed incrementally as adaptation data becomes available, which is termed "incremental adaptation."

Relevance function adaptation may also be accomplished using a variety of techniques. The most common methods are grouped into two categories: maximum likelihood adaptation and maximum a posteriori (MAP) approaches.

The MAP adaptation process is sometimes referred to as Bayesian learning. MAP adaptation involves the use of prior knowledge about model parameter distribution. Hence, if the parameters of the model are likely to be known using the prior knowledge (before observing any adaptation data), then the limited adaptation data may be used to obtain a relatively good MAP estimate. This type of prior is often termed an informative prior. If the prior distribution indicates no preference as to what the model parameters are likely to be (a non-informative prior), then the MAP estimate obtained will be identical to that obtained using a maximum likelihood approach. For MAP adaptation purposes, the informative priors that are generally used are context-independent (CI) model parameters.

EXAMPLE OF ADAPTING A RELEVANCE FUNCTION USING MAP

Embodiments of the invention are described in the context of adapting a Gaussian mixture relevance function. However, embodiments of the invention are not so limited. Non-limiting examples of other relevance functions that may be used in embodiments of the invention include a decision tree, a support vector machine, and a Bayesian class.

U.S. Pat. No. 7,197,497 (incorporated by reference above) describes methods of assigning a training relevance score to a document, and various methods of determining a relevance function based on subsets of documents, assigned training relevance scores, and a plurality of test queries.

Relevance functions that are composed of a finite set of coefficients and a base function are described. Embodiments of the invention range through various forms of relevance functions. Example embodiments include:

(a) the relevance function is a linear or nonlinear function of the coefficients and base function;
(b) the base functions are the features (as defined);
(c) the base function are parametric models (e.g., wavelets, neural networks); and
(d) the base functions are decision trees of some form.

Embodiments of the invention extend the methods of determining a relevance function. Specifically, given a well-trained relevance function in one context, methods are described to efficiently utilize a relatively small number of training samples from a new context (a plurality of query-document pairs and the associated human produced relevance scores) to adapt a CI relevance function to perform best in the new context.

One embodiment of an adaptation method is known as Bayesian adaptation. Bayesian adaptation is further described in an article entitled "Maximum a posteriori estimation of multivariate Gaussian mixture observations of Markov chains", by J. L. Gauvain, C.-H. Lee, which appears on pages 291-298 of volume 2, issue 2 of the publication IEEE Trans. Speech Audio Process, in 1994, which article is incorporated by reference as if fully set forth herein.

Bayesian adaptation is also known as Bayesian learning or MAP estimation. The MAP adaptation method may be applied to any of the embodiments of the relevance functions described in U.S. Pat. No. 7,197,497.

In one embodiment, MAP adaptation is applied to relevance functions of form (c) above, where the base functions are parametric models. In some embodiments, the parametric function is a mixture of Gaussian models, or a Gaussian mixture model (GMM). The GMM is defined as the following: For a D-dimensional feature vector, x, the mixture density is:

$$P(x \mid \lambda) = \sum_{i=1}^{M} w_i * p_i(x)$$

where $w_i$ denotes a scalar weight on the i-th mixture, and the density is a weighted linear combination of M uni-modal Gaussian densities, $p_i(x)$, each parameterized by a mean and covariance matrix. The parameters of the GMM can be trained using an expectation-maximization (EM) algorithm, which is described on pages 767-770 of "Text-Independent Speaker Recognition Speech Processing Handbook", by D. A. Reynolds and W. M. Campbell, published by Springer Verlag, which is incorporated by reference as if fully set forth herein. Using an EM algorithm, a GMM is trained in an original context (referred to as the "base GMM") where there are a relatively large number of training samples.

The base GMM is then adapted to a new context using the MAP algorithm to form a new relevance function for the new context. The MAP adaptation is defined by equations as the following: given a base GMM and training samples $X=\{x_1, x_2, \ldots, x_T\}$ from the new context, the probabilistic alignment of the training samples to the base GMM mixture components is first determined:

$$Pr(i|x_t) = w_i * p_i(x_t) / \sum_{j=1}^{M} w_j * p_j(x_t)$$

where $Pr(i|x_t)$ is the probabilistic alignment of sample $x_t$ to the i-th mixture of the GMM. $Pr(i|x_t)$ and $x_t$ are used to compute the sufficient statistics for the mean parameter, $$n_i = \sum_{t=1}^{T} Pr(i|x_t),$$

$$E_i(x) = 1/n_i * \sum_{t=1}^{T} Pr(i|x_t) * x_t.$$

The sufficient statistics from the training data of the new context are used to update the base GMM sufficient statistics for the mixture i to produce the adapted mean parameter for the mixture i $$\mu_i' = \alpha_i * E_i(x) + (1-\alpha_i) * \mu_i.$$

The data-dependent adaptation coefficients controlling the balance between the old and new estimates per mixture are $\{\alpha_i\}$, defined as $$\alpha_i = n_i/(n_i+r)$$

where r is a fixed factor that controls the amount of adaptation from the base GMM. For example, higher values of r will adapt the components of the base GMM less than lower values of r.

Once a relevance function is adapted to a particular context, the resulting CS relevance function is used to assign a relevance value (or score) to one or more documents (e.g., webpages). For example, a relevance function is adapted to the context of queries related to music, such as "I walk the line". Leveraging the training samples available for music (lyrics), the resulting CS relevance function alters the ranking of search results to rank documents and products from the late recording artist Johnny Cash.

Hardware Overview

Figure 3:
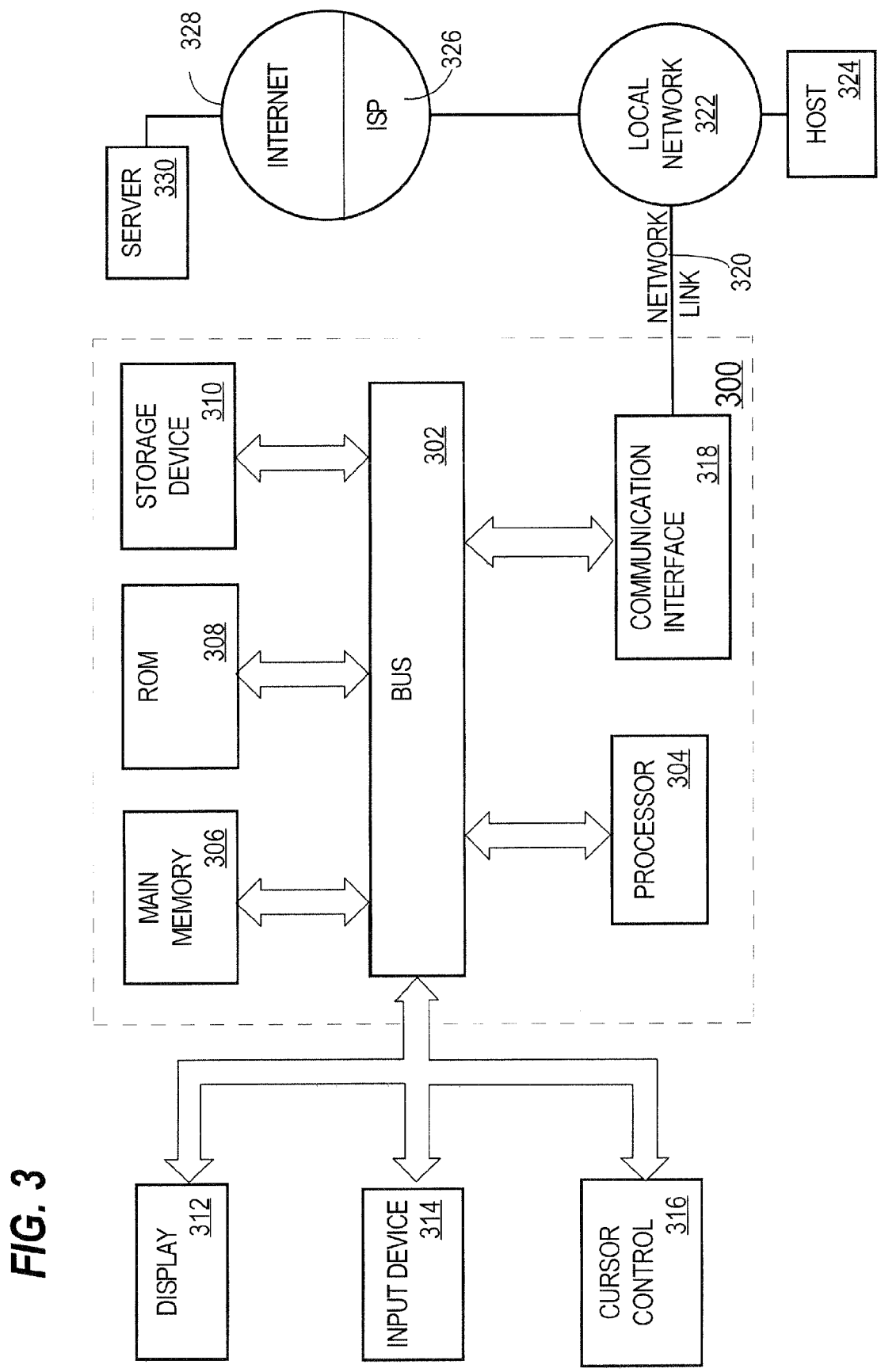
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
generating a generic relevance function based on training data from a plurality of first users and that is not based on a specific context associated with any of the plurality of first users;
storing the generic relevance function in a machine-readable storage medium;
collecting context-specific training data, wherein the context-specific training data is based on a plurality of second users and a specific context associated with the plurality of second users;
adapting the generic relevance function to produce a context-specific relevance function, wherein the adapting comprises using the generic relevance function and the context-specific training data as input to a machine learning technique to generate the context-specific relevance function;
after producing the context-specific relevance function, receiving a query from a particular user;
processing the query to identify results of the query;
identifying a particular context of the query or of the particular user;
selecting, based on the particular context, a particular context-specific relevance function from among a plurality of context-specific relevance functions;
using the particular context-specific relevance function to determine relevance of each of the results only in response to determining that the particular context is the same as the specific context upon which the particular context-specific relevance function is based;
based on the particular context-specific relevance function, assigning a relevance value to each of the results; and
sending, to the particular user, at least a subset of the results to be displayed;
wherein the method is performed by one or more computing devices.

2. The method of claim 1, wherein the specific context indicates a particular category of information that is provided by a plurality of documents.

3. The method of claim 2, wherein the particular category of information is one of: automobiles, finance, games, groups, jobs, maps, music, personals, real estate, shopping, sports, technology, travel, television, or yellow pages.

4. The method of claim 1, wherein the specific context indicates one or more characteristics that are shared by the plurality of second users.

5. The method of claim 4, wherein the one or more characteristics include one or more of: websites visited by the plurality of second users, geographic information of the plurality of second users, demographic information of the plurality of second users, tagging history of the plurality of second users, search history of the plurality of second users, or social network history of the plurality of second users.

6. The method of claim 1, wherein the adapting comprises producing a plurality of context-specific relevance functions, wherein for each context-specific relevance function of the plurality of context-specific relevance functions, said each context-specific relevance function is adapted from the generic relevance function based on adaptation data that is based on a particular plurality of users and a specific context that indicates one or more characteristics of the particular plurality of users.

7. The method of claim 6, wherein the one or more characteristics include one or more of: websites visited by the particular plurality of users, geographic information of the particular plurality of users, demographic information of the particular plurality of users, tagging history of the particular plurality of users, search history of the particular plurality of users, or social network history of the particular plurality of users.

8. The method of claim 1, further comprising:
after sending the subset of the results to the particular user, receiving additional data about the specific context upon which the particular context-specific relevance function is based;
adapting the particular context-specific relevance function using the additional data;
receiving a second query from a second user;
processing the second query to identify second results of the second query;
based on the adapted particular context-specific relevance function, assigning a relevance value to each of the second results; and
sending, to the second user, at least a subset of the second results to be displayed.

9. The method of claim 1, wherein:
the subset of results include references to webpages; and
the relevance value of each result in the subset dictates where said each result is displayed relative to other results in the subset.

10. The method of claim 1, wherein the subset of results include advertisements.

11. The method of claim 1, wherein adapting the generic relevance function to produce a context-specific relevance function includes applying a maximum a posteriori (MAP) adaptation technique to the generic relevance function.

12. The method of claim 1, wherein the generic relevance function comprises a Gaussian mixture model.

13. A non-transitory machine-readable medium carrying instructions which, when executed by one or more processors, cause:
generating a generic relevance function based on training data from a plurality of first users and that is not based on a specific context associated with any of the plurality of first users;
storing the generic relevance function in a machine-readable storage medium;
collecting context-specific training data, wherein the context-specific training data is based on a plurality of second users and a specific context associated with the plurality of second users;
adapting the generic relevance function to produce a context-specific relevance function, wherein the adapting comprises using the generic relevance function and the context-specific training data as input to a machine learning technique to generate the context-specific relevance function;
after producing the context-specific relevance function, receiving a query from a particular user;
processing the query to identify results of the query;
identifying a particular context of the query or of the particular user;
selecting, based on the particular context, a particular context-specific relevance function from among the plurality of context-specific relevance functions;
using the particular context-specific relevance function to determine relevance of each of the results only in response to determining that the particular context is the same as the specific context upon which the particular context-specific relevance function is based;
based on the particular context-specific relevance function, assigning a relevance value to each of the results; and
sending, to the particular user, at least a subset of the results to be displayed.

14. The machine-readable medium of claim 13, wherein the specific context indicates a particular category of information that is provided by a plurality of documents.

15. The machine-readable medium of claim 14, wherein the particular category of information is one of: automobiles, finance, games, groups, jobs, maps, music, personals, real estate, shopping, sports, technology, travel, television, or yellow pages.

16. The machine-readable medium of claim 13, wherein the specific context indicates one or more characteristics that are shared by the plurality of second users.

17. The machine-readable medium of claim 16, wherein the one or more characteristics include one or more of: websites visited by the plurality of second users, geographic information of the plurality of second users, demographic information of the plurality of second users, tagging history of the plurality of second users, search history of the plurality of second users, or social network history of the plurality of second users.

18. The machine-readable medium of claim 13, wherein the adapting comprises producing a plurality of context-specific relevance functions, wherein for each context-specific relevance function of the plurality of context-specific relevance functions, the said each context-specific relevance function is adapted from the generic relevance function based on adaptation data that is based on a particular plurality of users and a specific context that indicates one or more characteristics of the particular plurality of users.

19. The machine-readable medium of claim 18, wherein the one or more characteristics include one or more of: websites visited by the particular plurality of users, geographic information of the particular plurality of users, demographic information of the particular plurality of users, tagging history of the particular plurality of users, search history of the particular plurality of users, or social network history of the particular plurality of users.

20. The machine-readable medium of claim 18, wherein the instruction, when executed by the one or more processors, further cause:
after sending the subset of the results to the particular user, receiving additional data about the specific context upon which the particular context-specific relevance function is based;
adapting the particular context-specific relevance function using the additional data;
receiving a second query from a second user;
processing the second query to identify second results of the second query;
based on the adapted particular context-specific relevance function, assigning a relevance value to each of the second results; and
sending, to the second user, at least a subset of the second results to be displayed.

21. The machine-readable medium of claim 13, wherein:
the subset of results include references to webpages; and
the relevance value of each result in the subset dictates where said each result is displayed relative to other results in the subset.

22. The machine-readable medium of claim 13, wherein the subset of results include advertisements.

23. The machine-readable medium of claim 13, wherein adapting the generic relevance function to produce a context-specific relevance function includes applying a maximum a posteriori (MAP) adaptation technique to the generic relevance function.

24. The machine-readable medium of claim 13, wherein the generic relevance function comprises a Gaussian mixture model.

25. The method of claim 1, wherein selecting is not based on the query.

26. The machine-readable medium of claim 13, wherein selecting is not based on the query.

* * * * *